(12) United States Patent
Furumatsu et al.

(10) Patent No.: US 8,422,214 B2
(45) Date of Patent: Apr. 16, 2013

(54) MOBILE ELECTRONIC APPARATUS

(75) Inventors: Koichiro Furumatsu, Yokohama (JP); Izumi Arai, Yokohama (JP); Takaaki Watanabe, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 547 days.

(21) Appl. No.: 12/524,100

(22) PCT Filed: Jan. 25, 2008

(86) PCT No.: PCT/JP2008/051096
§ 371 (c)(1),
(2), (4) Date: Sep. 10, 2009

(87) PCT Pub. No.: WO2008/090983
PCT Pub. Date: Jul. 31, 2008

(65) Prior Publication Data
US 2010/0085689 A1  Apr. 8, 2010

(30) Foreign Application Priority Data

Jan. 25, 2007 (JP) ................................. 2007-015650
Jan. 25, 2007 (JP) ................................. 2007-015659

(51) Int. Cl.
*G06F 1/16* (2006.01)
(52) U.S. Cl.
USPC ............ 361/679.28; 361/679.27; 379/433.13; 455/575.1; 455/575.3
(58) Field of Classification Search .............. 361/679.28
See application file for complete search history.

(56) References Cited

U.S. PATENT DOCUMENTS

| | | | | |
|---|---|---|---|---|
| 7,283,853 | B2 * | 10/2007 | Kanazawa et al. | 455/575.1 |
| 7,483,726 | B2 * | 1/2009 | Hashizume et al. | 455/575.3 |
| 7,733,638 | B2 * | 6/2010 | Tanaka et al. | 361/679.28 |
| 7,945,298 | B2 * | 5/2011 | Takahashi | 455/575.3 |
| 2006/0116181 | A1 * | 6/2006 | Takahashi | 455/575.1 |

FOREIGN PATENT DOCUMENTS

| | | |
|---|---|---|
| JP | 2004-236181 A | 8/2004 |
| JP | 2006-067525 A | 3/2006 |

OTHER PUBLICATIONS

Office Action dated Apr. 10, 2012, issued in counterpart Japanese Application No. 2007-015659.

\* cited by examiner

*Primary Examiner* — Anthony Q Edwards
(74) *Attorney, Agent, or Firm* — Procopio, Cory, Hargreaves & Savitch LLP

(57) ABSTRACT

A mobile electronic apparatus has a display side housing with a bearing unit at one end, a dummy hinge with a rotary unit mounted in the bearing unit at one end and a joint unit at the other end, and a key side housing joined to the joint unit at one end. The housings are turnably connected to one another via the dummy hinge. A key side housing has a vertically extending boss unit. A joint unit has an insertion hole into which the boss unit is inserted. The insertion hole has a fitting hole, in which the boss unit is fitted when the joint unit and the key side housing are joined to one another, and a diameter-expanding hole in communication with the fitting hole and expanded in a rotational direction of the rotary unit toward the key side housing.

18 Claims, 20 Drawing Sheets

FIG. 4
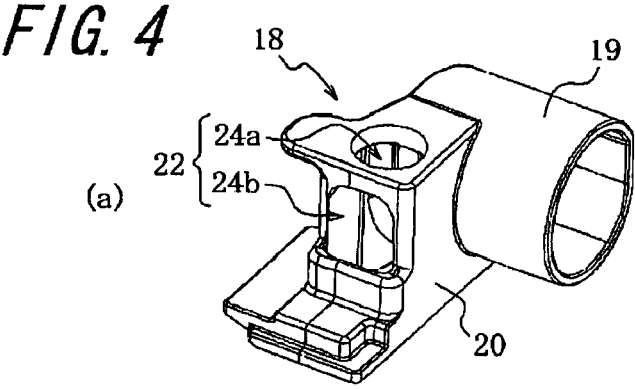
(a)
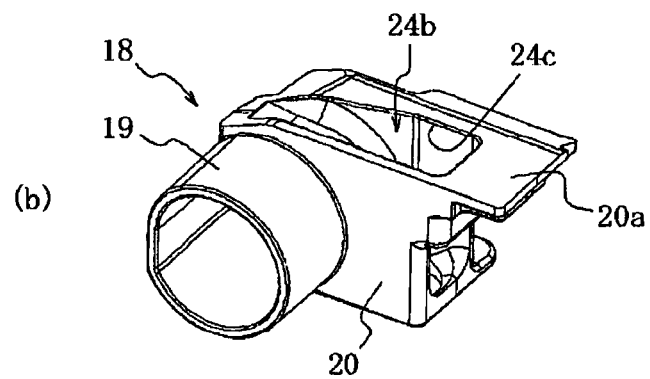
(b)
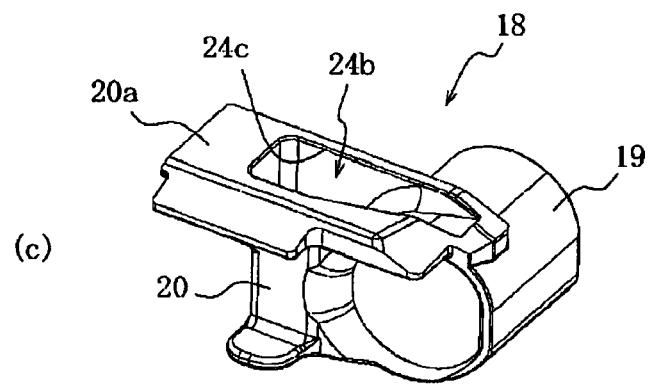
(c)

FIG. 21
(a)
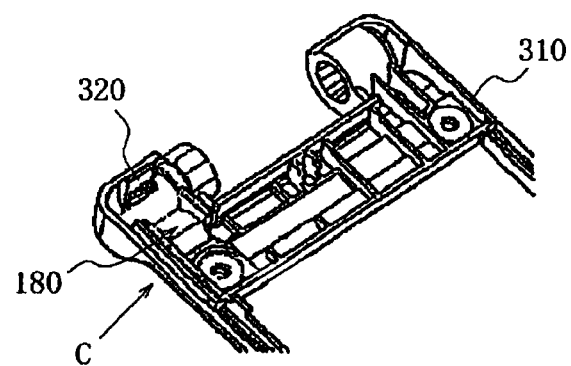
(b)
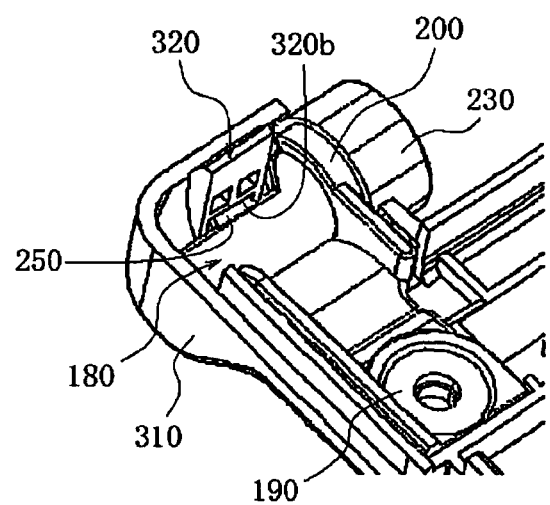

MOBILE ELECTRONIC APPARATUS

CROSS REFERENCE TO RELATED APPLICATION

The present application is the United States national stage application of international application serial number PCT/JP2008/051096, filed 25 Jan. 2008, which claims priority to Japanese Patent Application No. 2007-015659, filed on Jan. 25, 2007, and Japanese Patent Application No. 2007-015650, filed on Jan. 25, 2007, each of which is incorporated herein by reference in its entirety.

FIELD OF THE INVENTION

This invention relates to a mobile electronic apparatus having two housings turnably connected to one another via a connect member.

BACKGROUND

A folding-type mobile electronic apparatus having two housings, a display side housing and a key side housing, connected by a hinge unit (connecting mechanism) such that each housing can be moved close to or away from each other is conventionally known in the art. The two housings connected by the hinge unit can be opened and closed between an open state in which the housings are connected approximately linearly and a close state in which the housings are placed on top of one another.

The hinge unit connecting the two housings of the folding-type mobile electronic apparatus has an open/close hinge and a dummy hinge (connect member) that are arranged horizontally next to one another in an approximately linear manner. The dummy hinge is formed a tubular shape so as to insert a thin coaxial cable thereinto for electric connection of substrates disposed in each of the housings.

The dummy hinge is joined to a key rear case, constituting the key side housing together with a key front case, by a screw member, and a joint structure thereof has a casing member with a screw boss formed thereon and the connect member with a hole formed thereon into which the screw boss is inserted.

SUMMARY

However, since the hole to insert the screw boss thereinto is formed in a linear manner in the joint structure of the known folding-type mobile electronic apparatus, the casing member and the connect member must be moved linearly to be joined to one another. It is thus unavoidable to deteriorate a workability in joining/separating the casing member and the connect member.

In addition, the housings as set forth above are often joined to one another by engaging the two casing members with one another. However, the two casing members constituting the housing have been manufactured to be thinner due to a request for a thin the mobile electronic apparatus in recent years, which leads to a tendency of downsizing of an engaging structure such as thinning the two casing members constituting the housing and thereby reducing a depth of engaging units of the casing members.

There is thus a problem in the joining structure of the known mobile electronic apparatus set forth above that, when a heavy load in an opening direction of the two housings is applied onto the display side housing at an end thereof opposite to the other end connected to the key side housing while the housings are in the open state, engagement of the engaging units comes loose or disengages due to bend of the casing members and the two casing members separate from one another in a direction vertical to a rotational axis of the hinge unit, causing a gap between the casing members.

A first object of the present invention is to provide the mobile electronic apparatus having an excellent workability in joining/separating the casing members and the connect member and capable of improving ease of assembly. A second object of the present invention is to provide the mobile electronic apparatus capable of desirably preventing a gap caused between the two casing members constituting the housing even when a heavy load is applied onto the housing in the opening direction of the two housings.

In order to achieve the first object set forth above, a mobile electronic apparatus in accordance with the present invention comprises a first housing having a bearing unit at one end thereof, a connect member having a rotary unit mounted in the bearing unit at one end thereof and a joint unit at the other end thereof, and a second housing joined to the joint unit at one end thereof. The first housing and the second housing are turnably connected to one another via the connect member, and the second housing has a boss unit formed extending in a direction vertical to a rotational axis of the rotary unit. The joint unit has an insertion hole formed thereon to insert the boss unit thereinto, and the insertion hole has a fitting hole, to fit the boss unit therein when the joint unit and the second housing are joined to one another, and a diameter-expanding hole in communication with the fitting hole and expanded along a rotational direction of the rotary unit toward the second housing.

It is preferred that, in the mobile electronic apparatus in accordance with one embodiment of the present invention, the joint unit has an engaging unit to engage with the second housing when the boss unit is fitted in the fitting hole.

It is also preferred that, in the mobile electronic apparatus in accordance with another embodiment of the present invention, the second housing comprises a first casing member having the boss unit formed thereon and a second casing member joined to the first casing member via the connect member therebetween, and that the connect member has a regulatory unit, formed on a side where the rotary unit is located, and engages with one end of the first casing member so as to regulate separation of the one end from the turn unit at the end.

Moreover, it is preferred that, in the mobile electronic apparatus in accordance with still another embodiment of the present invention, the second housing comprises the first casing member having the boss unit formed thereon and the second casing member joined to the first casing member via the connect member there between, and is constituted by the first casing member and the second casing member by a screw member screwed into the boss unit, and the connect member is joined to the first casing member by the screw member screwed into the boss unit.

It is also preferred that, in the mobile electronic apparatus in accordance with still another embodiment of the present invention, a cable member wired through insides of the first housing and the second housing is inserted into the turn unit and the connect member has a positioning unit formed thereon to position the cable member.

In order to achieve the second object set forth above, a mobile electronic apparatus in accordance with the invention comprises a first housing having a bearing unit at one end thereof, a connect member having a rotary unit mounted in the bearing unit at one end thereof and a joint unit at the other end thereof, and a second housing joined to the joint unit at one end thereof. The first housing and the second housing are turnably connected to one another by the connect member. One of the first housing and the second housing comprises a first casing member and a second casing member joined to one another in a direction vertical to a rotational axis of the rotary unit. The connect member comprises a displacement regulatory unit engaging with one of the first casing member and the second casing member so as to regulate the displacement of the one of the casing members separating from the other casing member in the direction vertical to the rotational axis.

It is preferred that, in the mobile electronic apparatus in accordance with one embodiment the present invention, the second housing comprises the first casing member and the second casing member, the joint unit is joined to the first casing member, and the displacement regulatory unit engages with the first casing member.

It is also preferred that, in the mobile electronic apparatus in accordance with another embodiment of the present invention, the joint unit joins to the first casing member more on the side of the one end of the second housing than a joint portion of the joint unit joined to the first casing member, and the displacement regulatory unit engages with the first casing member on the side of the one end of the second housing from a joint portion of the joint unit joins to the first casing member.

Moreover, it is preferred that, in the mobile electronic apparatus in accordance with still another embodiment of the present invention, the first housing and the second housing are connected to one another to be capable of turning relatively to one another between a first state where the housings are disposed to face each other and a second state where the housings are unfolded from one another, and the first casing member is a casing member located on the side of the first housing in the first state.

It is also preferred that, in the mobile electronic apparatus in accordance with still another embodiment of the present invention, the engaging unit is formed on one of the first casing member and the second casing member while an engaged unit to be engaged with the engaging unit is formed on the other casing member, the first casing member and the second casing member are joined to one another by engagement of the engaging unit and the engaged unit, and the displacement regulatory unit engages with a portion corresponding to the engaging unit or the engaged unit.

According to the first invention set forth above, it is possible to improve ease of assembly with an excellent workability in joining/separating the casing members and the connect member.

Moreover, according to the second invention set forth above, since, when a force in a turning direction is applied onto one of the first casing member and the second casing member, the displacement regulatory unit of the connect member regulates the displacement of the one of the casing members separating from the other in a direction vertical to the rotational axis of the rotary unit by engaging with one of the casing members, it is possible to regulate the displacement of the one of the casing members in the direction vertical to the rotational axis of the rotary unit (direction separating from the other casing member), thereby preventing a gap caused between the casing members.

BRIEF DESCRIPTION OF DRAWINGS

FIG. 4 illustrates the dummy hinge of FIG. 3: (a) is a perspective view from a direction different from that of FIG. 3, (b) is a perspective view from the direction different from that of (a), and (c) is a perspective view from the direction different from that of (b);

FIG. 21 illustrates an assembled state of the dummy hinge inside the hinge-side end of the front case of the housing for a liquid crystal display of the cellular phone in accordance with another embodiment of the present invention: (a) is an overall view inside of the front case at the hinge-side end and the dummy hinge and (b) is a perspective view illustrating an enlarged view of the section indicated by an arrow C in (a);

DETAILED DESCRIPTION

Embodiments of the present invention will be described with reference to the accompanying drawings.

First Embodiment

Figure 1:
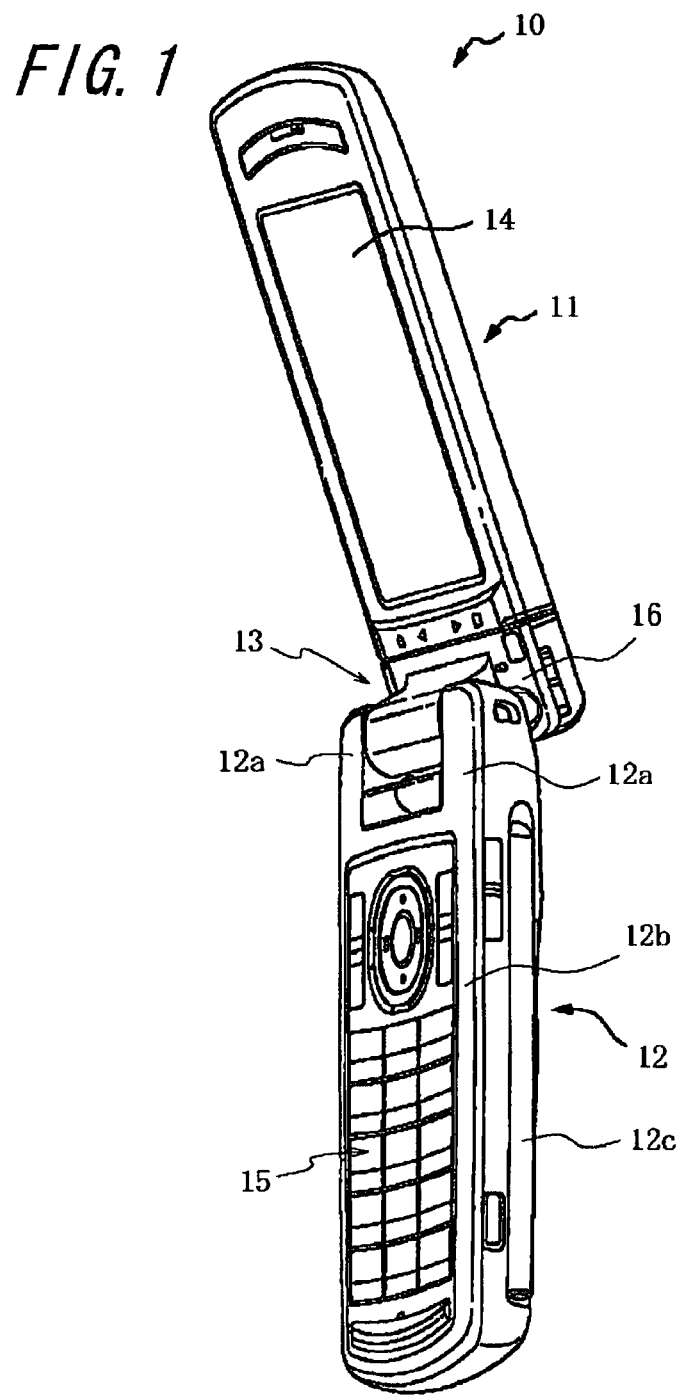
FIG. 1 is a perspective view of a cellular phone in an open state in accordance with a first embodiment of the present invention.

FIG. 1 is a perspective view of a cellular phone in an open state, exemplifying a mobile electronic apparatus in accordance with a first embodiment of the present invention. As shown in FIG. 1, a cellular phone 10 as an example of the mobile electronic apparatus has a folding structure with, for example, a display side housing (first housing) 11 and a key side housing (second housing) 12 connected to one another by a hinge unit 13 to be movable close to or away from each other.

The hinge unit 13 is provided to protrude at one end of the display side housing 11 and pivotally supported by a pair of hinge attaching units 12a and 12a formed at one end of the key side housing 12 in a freely turnable manner. The display side housing 11 and the key side housing 12 connected to one another by the hinge unit 13 can be opened and closed freely between an open state where the housings are connected approximately linearly and a close state where the housings are placed on top of one another.

The display side housing 11 is provided with a main liquid crystal display (Liquid Crystal Display: LCD) 14 on one face thereof, while the key side housing 12 is provided with an operation unit 15, having a plurality of operation keys capable of being pressed down for operation, on one face thereof, respectively. The key side housing 12 is constituted of a key front case 12b and a key rear case 12c on a periphery thereof and the operation unit 15 is provided so as to be exposed on a side of the key front case 12b.

Figure 2:
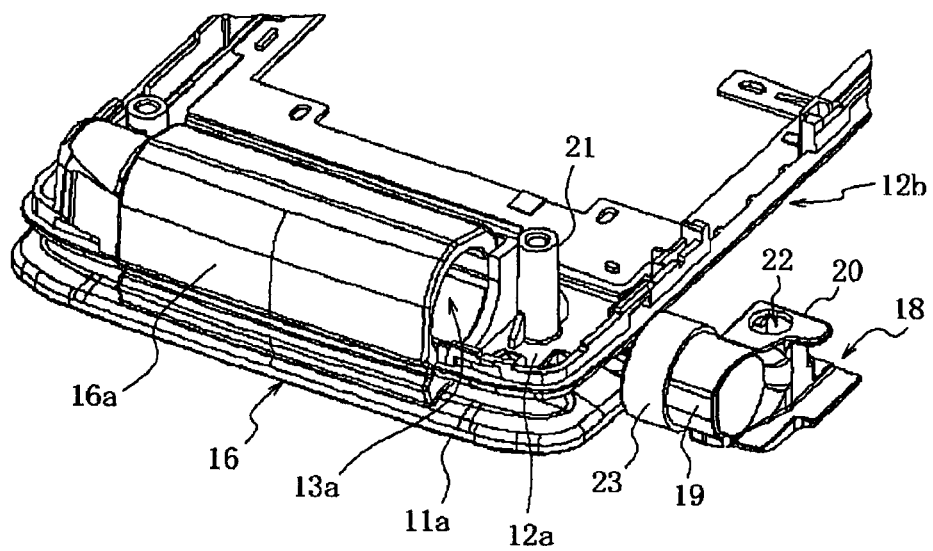
FIG. 2 is a partial perspective view of a key front case constituting a key side housing of FIG. 1.

FIG. 2 is a partial perspective view of the key front case 12b constituting the key side housing of FIG. 1. As shown in FIG. 2, in a state where the display side housing 11 and the key side housing 12 are connected to one another, a bearing unit 13a of a hinge unit 13 constituting a part of the display side housing 11 is formed as an interior cavity of a cylindrical portion placed sideways inside a hinge disposing unit 16a of a hinge front case 16 constituting an outer case of the hinge unit 13, so as to open inside the key front case (first casing member) 12b of the key side housing 12.

A hinge member (not shown) constituting a hinge unit (connection mechanism), for holding the two housings in the open state or the close state and for providing a feeling of moderation during open and close operation of the housings, is mounted in the bearing unit 13a on one side of a width direction of the housing (on the left side of FIG. 2). In addition, a dummy hinge (connect member) 18 is mounted in the bearing unit 13a on the other side of the width direction of the housing. The dummy hinge 18 is arranged in pairs with the hinge member described above and provided with a hole for passing a cable member (thin coaxial cable, for example) described below there through for electrical connection of circuit boards incorporated in each of the display side housing 11 and the key side housing 12.

That is, the cellular phone 10, exemplifying the mobile electronic apparatus, is provided with the display side housing 11 having the bearing unit 13a at one end thereof, the hinge member, the dummy hinge 18 having a rotary unit 19 mounted in the bearing unit 13a at one end thereof and a joint unit 20 at the other end thereof, and the key side housing 12 joined to the joint unit 20 at one end thereof. The display side housing 11 and the key side housing 12 are turnably connected to one another via the hinge member and the dummy hinge 18.

The dummy hinge 18 made of metal has the joint unit 20 and the rotary unit 19 rotatably mounted on the joint unit 20. The joint unit 20 is provided with an insertion hole 22 formed thereon to insert the boss unit 21, which is integrally formed with the hinge attaching unit 12a of the key front case 12b, thereinto. The rotary unit 19 is formed in a cylindrical shape having a hole to insert the cable members thereinto. The boss unit 21 is located next to the bearing unit 13a and extends in a direction approximately vertical to a rotational axis of the rotary unit 19 to protrude inside the key front case 12b.

In order to support smooth rotation of the rotary unit 19, the dummy hinge 18 is inserted and joined to an opening of the bearing unit 13a via a collar 23 in a ring shape, slidable and made of resin, for example. In this state, the boss unit 21 is inserted into the insertion hole 22 of the joint unit 20 and then positioned and fixed.

As set forth above, the key side housing 12 has the key front case 12b having the boss unit 21 formed thereon, and a key rear case (second casing member, see FIG. 8) 12c described below joined to the key front case 12b via the dummy hinge 18 therebetween. The key side housing 12 is constituted of the key front case 12b and the key rear case 12c connected to one another by a screw member (not shown) screwed into the boss unit 21.

It is thus possible to position the dummy hinge 18 by use of the boss unit 21 for jointing the key front case 12b and the key rear case 12c, which enables a simple (compact) constitution. In addition, it is also possible to join the dummy hinge 18 to the key front case 12b by screw joint using the screw member, which improves strength of the housing.

Figure 3:
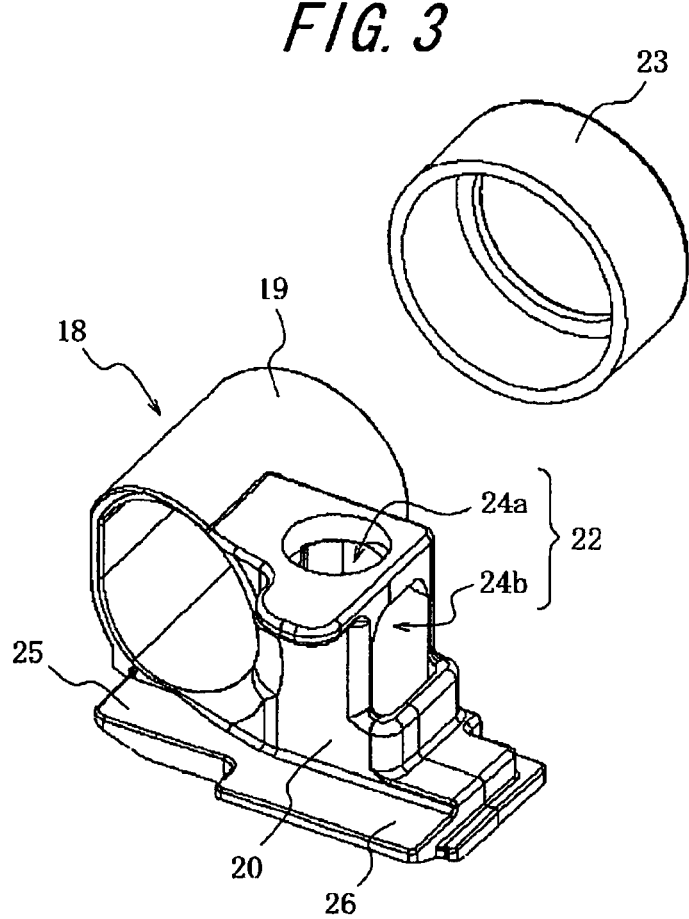
FIG. 3 is a perspective view of a dummy hinge and a collar mounted on the dummy hinge of FIG. 2.

FIG. 3 is a perspective view of the dummy hinge and a collar mounted on the dummy hinge of FIG. 2. FIG. 4 illustrates the dummy hinge of FIG. 3: (a) is a perspective view from a direction different from that of FIG. 3, (b) is a perspective view from the direction different from that of (a), and (c) is a perspective view from the direction different from that of (b).

As shown in FIG. 3, a collar 23, having the rotary unit 19 of the dummy hinge 18 inserted therein, is closely fixed to the outer peripheral surface of the rotary unit 19.

As shown in FIGS. 3 and 4, the insertion hole 22, formed on the joint unit 20 of the dummy hinge 18, is provided with a fitting hole 24a to fit the boss unit 21 therein when the joint unit 20 and the key front case 12b, i.e., the key side housing 12, are joined to one another, and a diameter-expanding hole 24b. The diameter-expanding hole 24b is in communication with the fitting hole 24a and the diameter thereof is expanded along a rotational direction of the rotary unit 19 toward the key side housing 12.

That is, the diameter-expanding hole 24b is sufficiently wider than an external diameter of the boss unit 21 at a bottom side opening 24c, from which the boss unit 21 is inserted into, generally reducing its width along the periphery of the rotary unit 19, and becomes in communication with the fitting hole 24a having an internal diameter to fit the boss unit 21 therein.

It is to be noted that the diameter-expanding hole 24b has a clearance shape for boss unit so as not to interfere with the boss unit 21 by catching it which has come into the diameter-expanding hole 24b at the time of rotational fitting of the turn unit 20.

Figure 5:
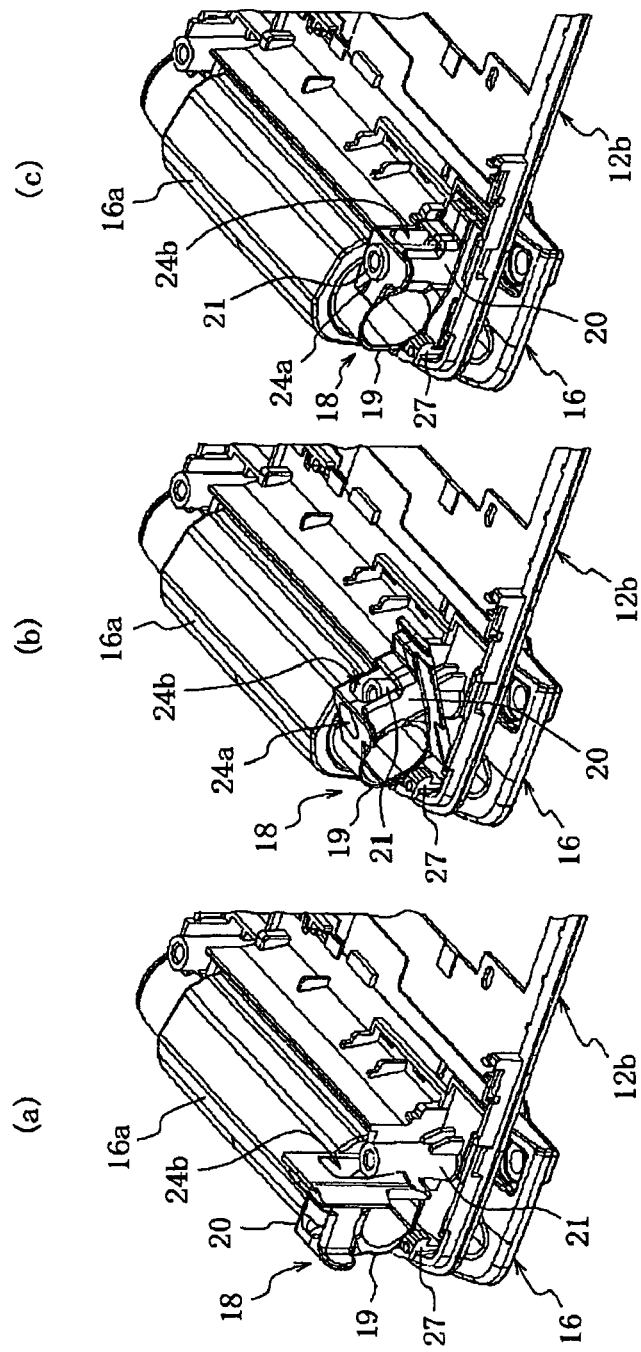
FIG. 5 illustrates a method for mounting the dummy hinge: (a) is a perspective view at a start of mounting, (b) is a perspective view of the dummy hinge being rotated, and (c) is a perspective view at a completion of mounting.
Figure 6:
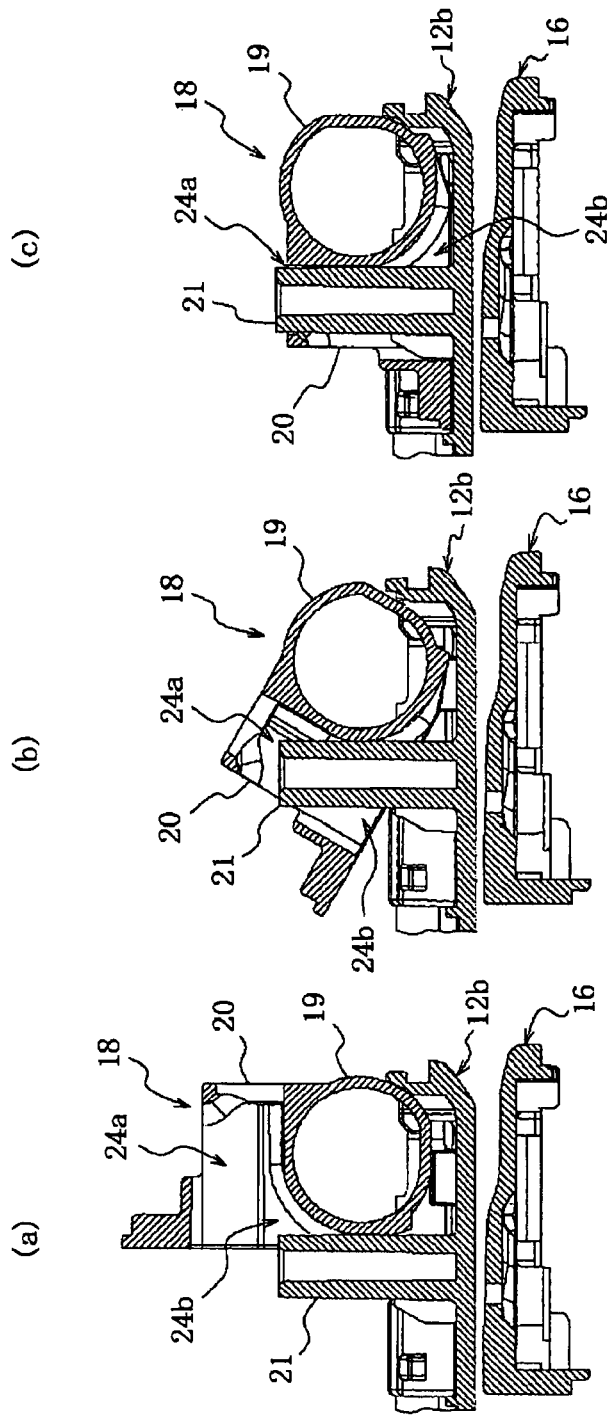
FIG. 6 illustrates the method for mounting the dummy hinge viewed from the direction different from that of FIG. 5: (a) is a cross-sectional explanatory view at the start of mounting, (b) is a cross-sectional explanatory view of the dummy hinge being rotated, and (c) is a cross-sectional explanatory view at the completion of mounting.

FIG. 5 illustrates a method for mounting the dummy hinge 18: (a) is a perspective view at a start of mounting, (b) is a perspective view of the dummy hinge being rotated, and (c) is a perspective view at a completion of mounting. FIG. 6 illustrates the method for mounting the dummy hinge 18 viewed from the direction different from that of FIG. 5: (a) is a cross-sectional explanatory view at the start of mounting, (b) is a cross-sectional explanatory view of the dummy hinge being rotated, and (c) is a cross-sectional explanatory view at the completion of mounting.

As shown in FIGS. 5 and 6, in order to mount the dummy hinge 18, first the dummy hinge 18, having the rotary unit 19 with the collar 23 mounted thereon being inserted into the bearing unit 13a of the hinge unit 13, is disposed next to the boss unit 21, while the joint unit 20 is in a stand-up state such that the boss unit 21 of the key front case 12b is located at the diameter-expanding hole 24b (see FIG. 5(a) and FIG. 6(a)).

Next, the joint unit 20 in the stand-up state is rotated downward such that the boss unit 21 is inserted into the diameter-expanding hole 24b. At this point, the joint unit 20 smoothly rotates using the rotary unit 19 inserted into the bearing unit 13a as a rotational axis and, simultaneously, the boss unit 21 is inserted into the diameter-expanding hole 24b (see FIG. 5(b) and FIG. 6(b)).

Then, the joint unit 20 is rotated further downward such that a bottom face 20a of the joint unit 20 comes into contact with an inner face of the key front case 12b. At this point, the boss unit 21 inserted into the diameter-expanding hole 24b is guided from the diameter-expanding hole 24b to the fitting hole 24a. Simultaneously with the contact of the bottom face 20a of the joint unit 20 with the inner face of the key front case 12b, the boss unit 21 is mounted in the fitting hole 24a in a fitting state to protrude a top end thereof from a top of the fitting hole 24a (see FIG. 5(c) and FIG. 6(c)).

Since the insertion hole 22, into which the boss unit 21 of the key side housing 12 is inserted, is formed such that its diameter is expanded along the rotational direction of the rotary unit 19 as set forth above, it is possible to engage the dummy hinge 18 being rotated with the key side housing 12, while the rotary unit 19 is inserted into the bearing unit 13a and the key side housing 12 is attached to the hinge unit 13 (display side housing 11). It is thus possible to improve ease of assembly of the dummy hinge 18 and the key side housing 12, which leads to an improvement of the ease of assembly of the display side housing 11 and the key side housing 12.

In addition, as shown in FIG. 3, the joint unit 20 of the dummy hinge 18 has a regulatory unit 25 formed at the bottom thereof which comes into contact with the key front case 12b on the side where the rotary unit 19 is located. The joint unit 20 also has an engaging unit 26 to engage with the key side housing 12 (key front case 12b) when the boss unit 21 is fitted in the fitting hole 24a. Each of the regulatory unit 25 and the engaging unit 26 is formed in the shape of a flange having a bottom portion expanding at the bottom of the joint unit 20.

Figure 7:
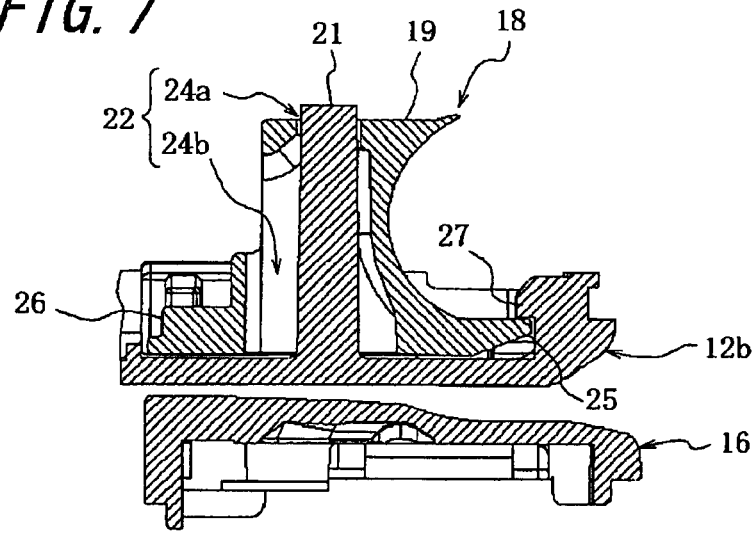
FIG. 7 is a cross-sectional explanatory view along a longitudinal direction of the key front case showing a regulatory unit of the dummy hinge.
Figure 8:
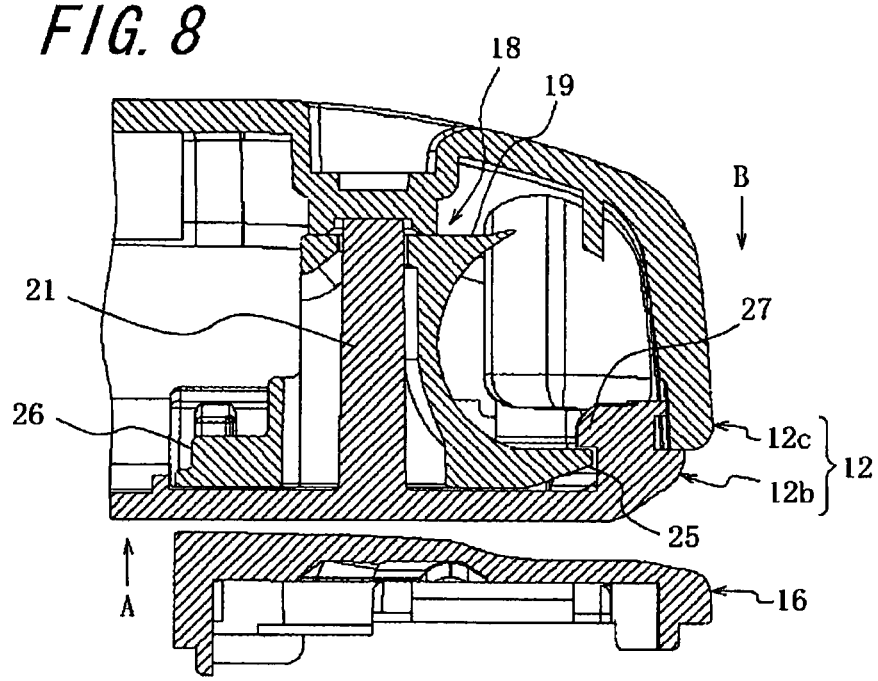
FIG. 8 is a cross-sectional explanatory view of a function of the regulatory unit of the dummy hinge.

FIG. 7 is a cross-sectional explanatory view along the longitudinal direction of the key front case 12b showing the regulatory unit 25 of the dummy hinge 18. FIG. 8 is a cross-sectional explanatory view illustrating a function of the regulatory unit 25 of the dummy hinge 18. As shown in FIG. 7, the regulatory unit 25 is formed at the bottom of the dummy hinge 18 at one end side of the longitudinal direction of the key side housing 12 when the boss unit 21 is fitted in the fitting hole 24a and the dummy hinge 18 is positioned and secured (on the right side in FIGS. 7 and 8). The regulatory unit 25 engages with a claw portion 27 (see FIG. 5) formed on the same end side inside of the key front case 12b to correspond to the regulatory unit 25. Since the regulatory unit 25 comes into contact with and engages with the claw portion 27 from underneath thereof (see FIG. 5(c)), separation of the one end side from the turn unit 20 is regulated when load in an opening direction is applied onto the housings 11 and 12.

That is, as shown in FIG. 8, when overload in A direction is applied onto the key side housing 12, a force in B direction acts on a hinge-side end of the key front case 12b to separate the hinge-side end of the key front case 12b from the key rear case 12c. However, since the regulatory unit 25 of the dummy hinge 18 held by the bearing unit 13a via the rotational axis 19 engages with the key front case 12b, the hinge-side end of the key front case 12b does not separate from the key rear case 12c, thereby it prevents a gap caused by separation.

As set forth above, when the force in the turning direction acts onto either the key front case 12b or the key rear case 12c, it regulates displacement of the one of the cases into a direction vertical to the turning axis of the turn unit 20 (direction separating from the other case). It is thus possible to prevent the gap caused between the cases 12b and 12c. Moreover, being capable of preventing the gap, it enables simplification and downsizing of an engaging structure of the cases 12b and 12c.

Figure 9:
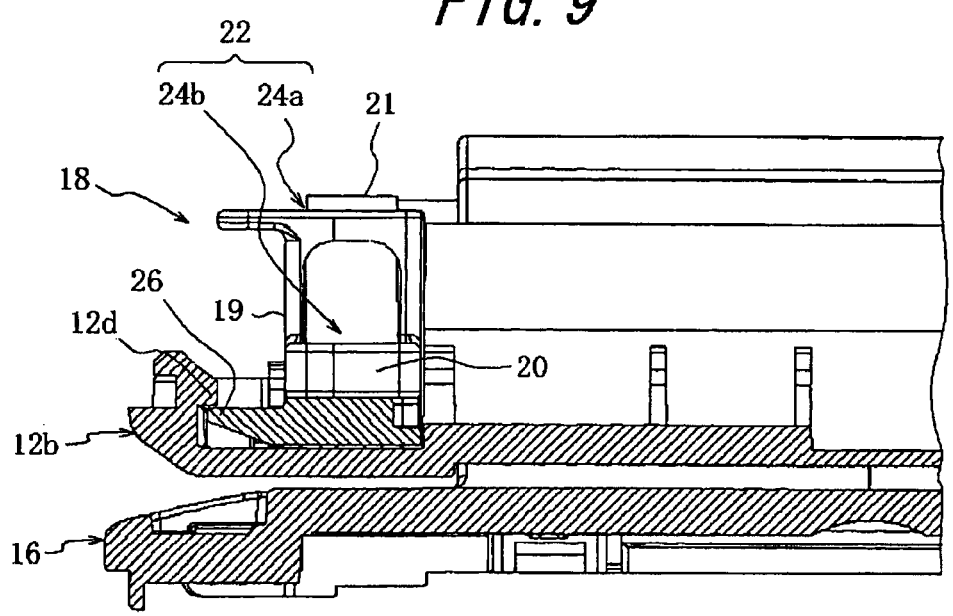
FIG. 9 is a cross-sectional view along a width direction of the key front case showing an engaging unit of the dummy hinge.

FIG. 9 is a cross-sectional explanatory view along a width direction of the key front case 12b showing an engaging unit 26 of the dummy hinge 18. As shown in FIG. 9, when the rotary unit 19 being mounted in the bearing unit 13a is rotated and thus the boss unit 21 is fitted in the fitting hole 24a of the insertion hole 22, the engaging unit 26 is engaged with a protruding claw 12d formed on a side face of the key front case 12b, i.e., the key side housing 12. The engaging unit 26 is formed at the bottom of the joint unit 20 at one end side of the width direction of the key side housing 12 (on the left side in FIG. 9). Turn of the dummy hinge 18 is thus regulated, which enables easy connection of the display side housing 11 and the key side housing 12 via the dummy hinge 18.

Figure 10:
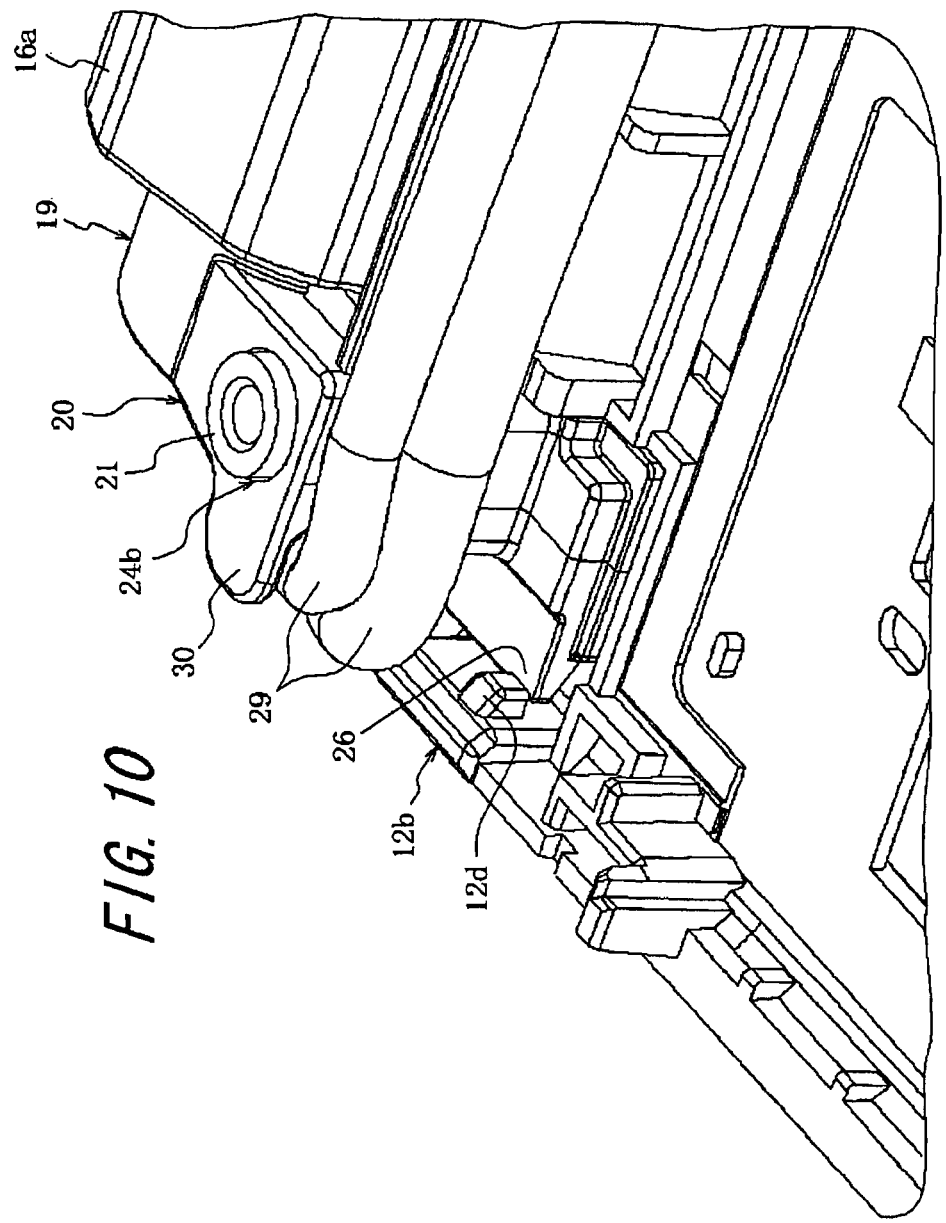
FIG. 10 is a perspective explanatory view of a positioning status of cable members, inserted into the rotary unit, in relation to the dummy hinge.

FIG. 10 is a perspective explanatory view of a positioning status of cable members 29, inserted into the rotary unit 19, in relation to the dummy hinge 18. As shown in FIG. 10, the cable members 29 (thin coaxial cables, for example), arranged through insides of the display side housing 11 and the key side housing 12, are inserted into the rotary unit 19. The cable members 29 are disposed along the joint unit 20 of the dummy hinge 18. A positioning unit 30, in the shape of a visor for shielding the cable members 29 from on top thereof, is formed at a top end of the joint unit 20. By use of the positioning unit 30, it is possible to guide the cable members 29 along the peripheral surface of the joint unit 20 to the rotary unit 19, while preventing the cable members 29 from moving upward. It is thus possible to improve workability in wiring the cable members 29.

Although being described based on the embodiment stated above, the present invention is not limited thereto but includes various modifications within the scope of the present invention. The present invention can be thus applied not only to a communication terminal apparatus such as the cellular phone but, for example, to other mobile electronic apparatuses having two housings turnably connected to one another via a connect member.

Second Embodiment

Figure 11:
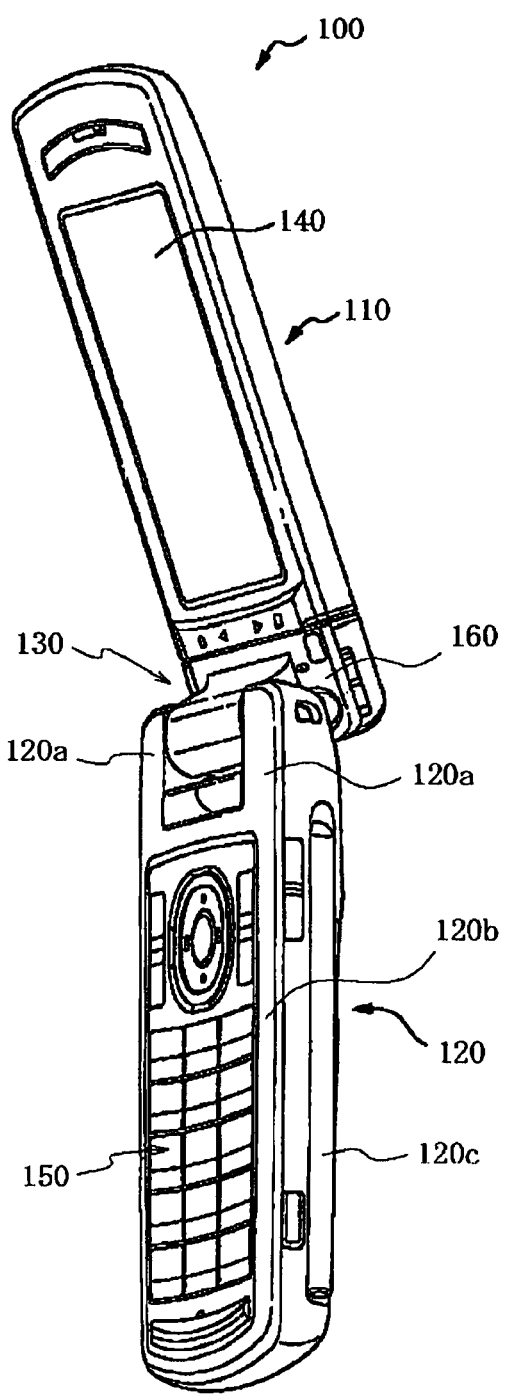
FIG. 11 is a perspective view of the cellular phone in the open state in accordance with a second embodiment of the present invention.

FIG. 11 is a perspective view of the cellular phone in the open state, exemplifying the mobile electronic apparatus in accordance with a second embodiment of the present invention. As shown in FIG. 11, a cellular phone 100 as an example of the mobile electronics apparatus has a folding structure with, for example, a display side housing (first housing) 110 and a key side housing (second housing) 120 connected to one another by a hinge unit 130 to be movable close to or away from each other.

The hinge unit 130 is provided in a protruding state at one end side of the display side housing 110 and pivotally supported by a pair of hinge attaching units 120a and 120a formed at one end of the key side housing 120 in a freely turnable manner. The display side housing 110 and the key side housing 120 connected to one another by the hinge unit 130 can opened and closed freely between the close state (the first state: not shown) where the housings are placed on top of one another facing each other and the open state (the second state) where both housings are unfolded and connected approximately linearly.

The display side housing 110 is provided with a main liquid crystal display (Liquid Crystal Display: LCD) 140 on one face side thereof facing the left side in FIG. 11, while the key side housing 120 is provided with an operation unit 150, having a plurality of operation keys capable of being pressed down for operation, on one face side thereof facing the left side in FIG. 11. The key side housing 120 is constituted of a key front case 120b and a key rear case 120c at the periphery thereof, with the operation unit 150 exposed on the side of the key front case 120b.

Figure 12:
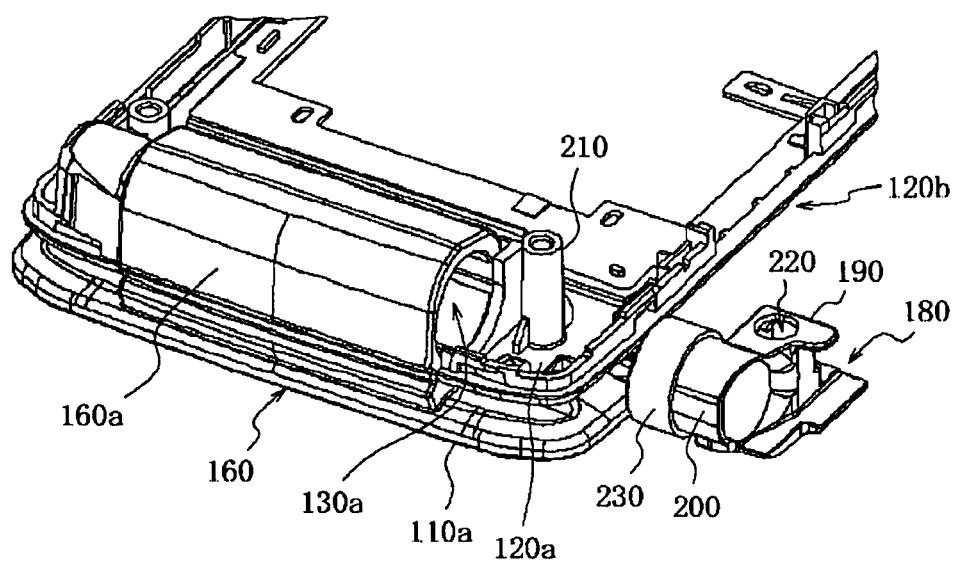
FIG. 12 is a partial perspective view of the key front case constituting the key side housing of FIG. 11.

FIG. 12 is a partial perspective view of the key front case 120b constituting the key side housing 120 of FIG. 11. As shown in FIG. 12, in a state where the display side housing 110 and the key side housing 120 are connected to one another, a bearing unit 130a of a hinge unit 130 constituting a part of the display side housing 110 is formed as an interior cavity of cylindrical portion placed sideways inside a hinge disposing unit 160a of a hinge front case 160 constituting an outer case of the hinge unit 130. The bearing unit 130a opens inside the key front case (first casing member) 120b of the key side housing 120.

A hinge member (not shown) constituting a hinge unit (connection mechanism), for holding the two housings in the open state or the close state and for providing a feeling of moderation during when open and close operation of the housings, is mounted in the bearing unit 130a on one side of a width direction of the housing (on the left side in FIG. 12). In addition, a dummy hinge (connect member) 180 is mounted in the bearing unit 130a on the other side of the width direction of the housing (on the right side in FIG. 12). The dummy hinge 180 is arranged in pairs with the hinge member described above and provided with a hole for passing cable members (thin coaxial cable, for example) there through described below for electrical connection of the circuit boards incorporated in each of the display side housing 110 and the key side housing 120.

That is, the cellular phone 100, exemplifying the mobile electronic apparatus, is provided with the display side housing 110 having the bearing unit 130a at one end thereof, the hinge member, the dummy hinge 180 having a rotary unit 20 mounted in the bearing unit 130a at one end thereof and a joint unit 190 at the other end thereof, and the key side housing 120 joined to the joint unit 190 at one end thereof. The display side housing 110 and the key side housing 120 of the cellular phone 110 are turnably connected to one another via the hinge unit and the dummy hinge 180.

The dummy hinge 180 made of metal has the joint unit 190 and the rotary unit 200 rotatably mounted on the joint unit 190. The joint unit 190 is provided with an insertion hole 220 formed thereon to insert the boss unit 210, which is integrally formed inside corresponding to the hinge attaching unit 120a of the key front case 120b, thereinto. The rotary unit 200 is formed in a cylindrical shape having a hole to insert the cable members thereinto. On the other hand, the boss unit 210 of the key side housing 120 is located next to the bearing unit 130a and extends in a direction approximately vertical to the rotational axis of the rotary unit 200 to protrude inside the key front case 120b.

In order to support smooth rotation of the rotary unit 200, the dummy hinge 180 is inserted and joined to the opening of the bearing unit 130a via a collar 230 in a ring shape, slidable and made of resin, for example. In this state, the boss unit 210 is inserted into the insertion hole 220 of the joint unit 190 and then positioned and fixed.

Figure 18:
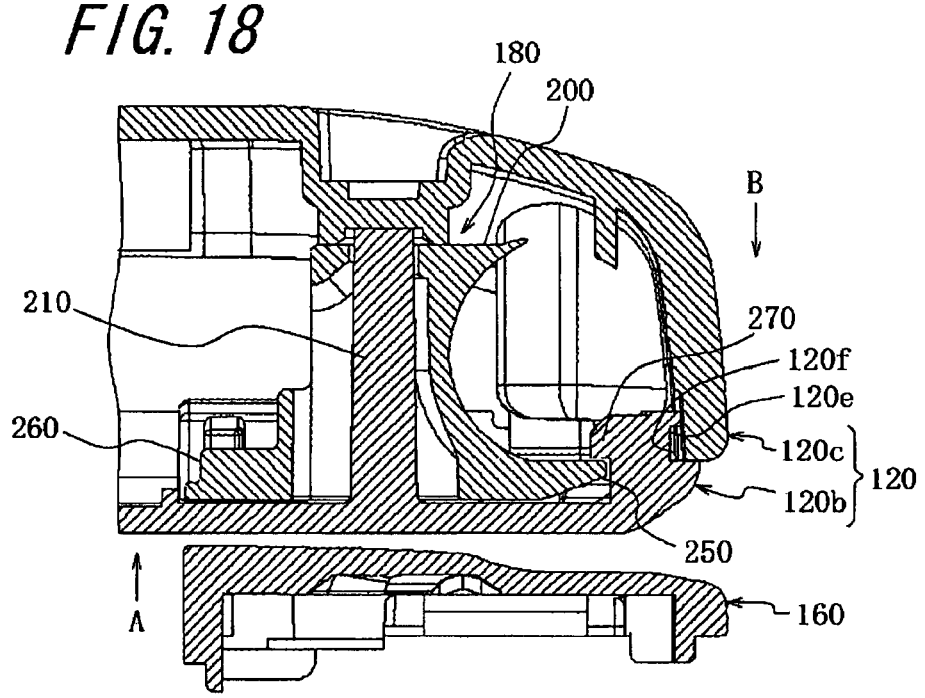
FIG. 18 is a cross-sectional explanatory view illustrating the function of the regulatory unit of the dummy hinge.

As set forth above, the key side housing 120 has the key front case 120b having the boss unit 210 formed thereon, and a key rear case 120c (second casing member, see FIG. 18) described below joined to the key front case 120b via the dummy hinge 180 therebetween. The key side housing 120 is constituted of the key front case 120b and the key rear case 120c connected to one another by a screw member (not shown) screwed into the boss unit 210, as shown in FIG. 18.

It is thus possible to position the dummy hinge 180 by use of the boss unit 210 for jointing the key front case 120b and the key rear case 120c, which enables a simple (compact) constitution. In addition, it is also possible to join the dummy hinge 180 to the key front case 120b by screw joint using the screw member, which improves strength of the housings.

Figure 13:
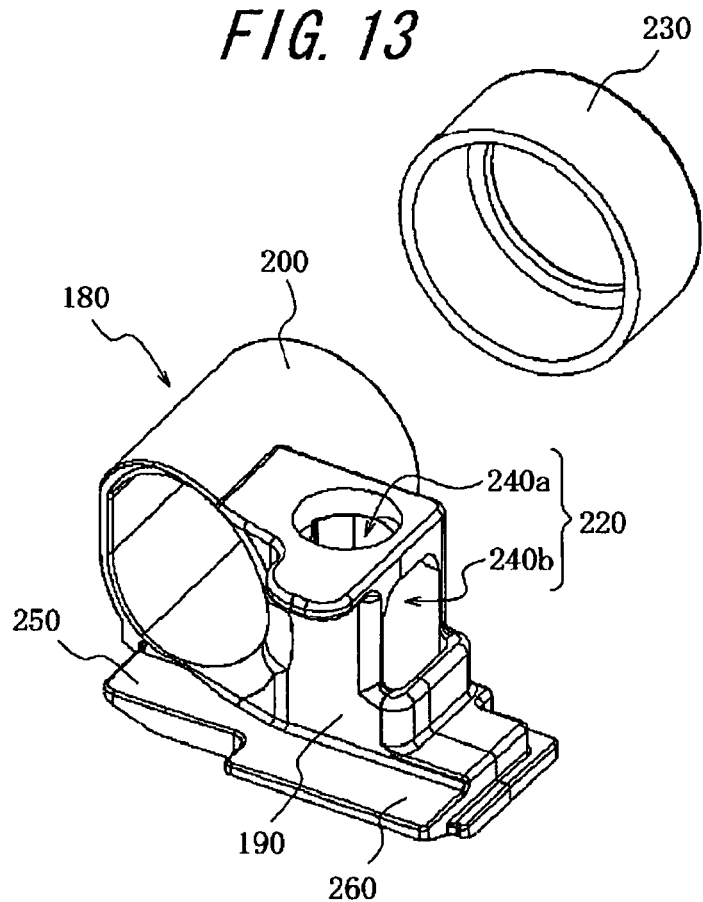
FIG. 13 is a perspective view of the dummy hinge of FIG. 12 and the collar mounted on the dummy hinge.
Figure 14:
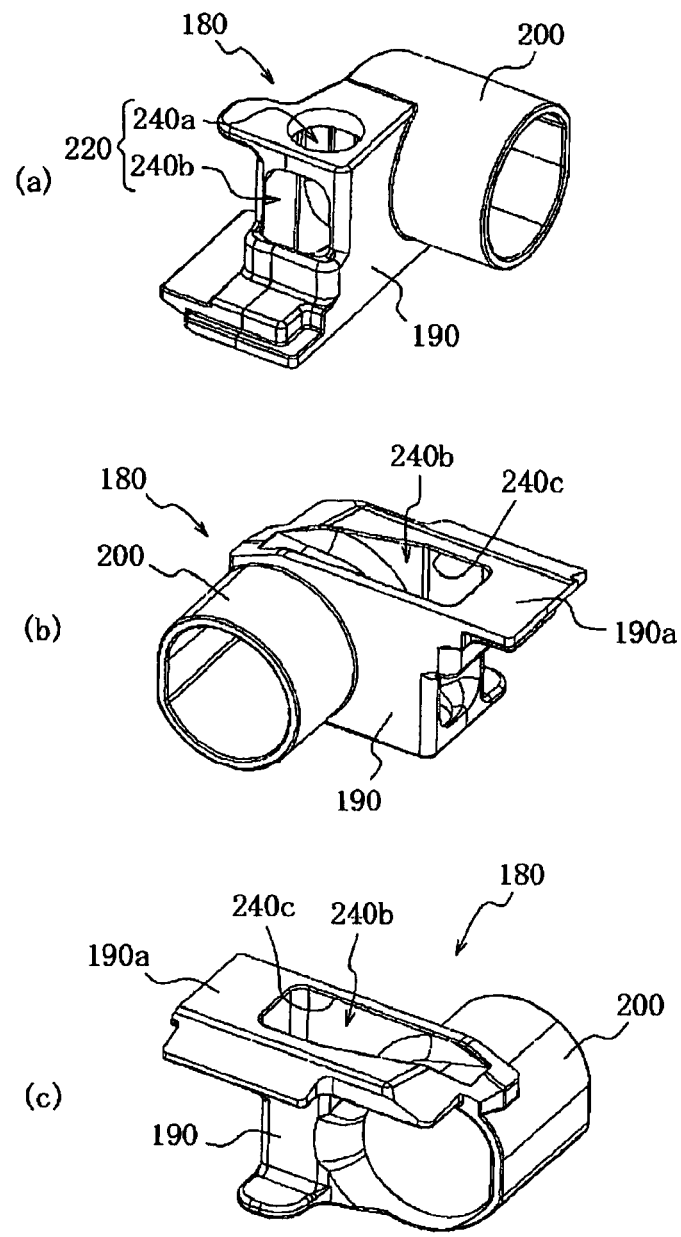
FIG. 14 illustrates the dummy hinge of FIG. 13: (a) is a perspective view from the direction different from that of FIG. 13, (b) is a perspective view from the direction different from that of (a), and (c) is a perspective view from the direction different from that of (b)

FIG. 13 is a perspective view of the dummy hinge 180 and a collar 230 mounted on the dummy hinge 180 of FIG. 12. FIG. 14 illustrates the dummy hinge 180 of FIG. 13: (a) is a perspective view from the direction different from that of FIG. 13, (b) is a perspective view from the direction different from that of (a), and (c) is a perspective view from the direction different from that of (b).

As shown in FIG. 13, the collar 230, having the rotary unit 200 of the dummy hinge 180 inserted therein, is closely fixed to the peripheral surface of the rotary unit 200. As shown in FIGS. 13 and 14, the insertion hole 220, provided on the joint unit 190 of the dummy hinge 180, is provided with a fitting hole 240a to fit the boss unit 210 therein when the joint unit 190 and the key front case 120b, i.e., the key side housing 120, are joined to one another, and a diameter-expanding hole 240b. The diameter-expanding hole 240b is in communication with the fitting hole 240a and the diameter thereof is expanded along a rotational direction of the rotary unit 200 toward the key side housing 120.

That is, the diameter-expanding hole 240b is sufficiently wider than the external diameter of the boss unit 210 at a bottom side opening 240c, from which the boss unit 210 is inserted into, generally reducing its width along the periphery of the turn unit 200, and becomes in communication with the fitting hole 240a having the internal diameter to fit the boss unit 210 therein. It is to be noted that the diameter-expanding hole 240b has a clearance shape for boss unit so as not to interfere with the boss unit 210 by catching it which has come into the diameter-expanding hole 240b at the time of rotational fitting of the turning unit 200.

Figure 15:
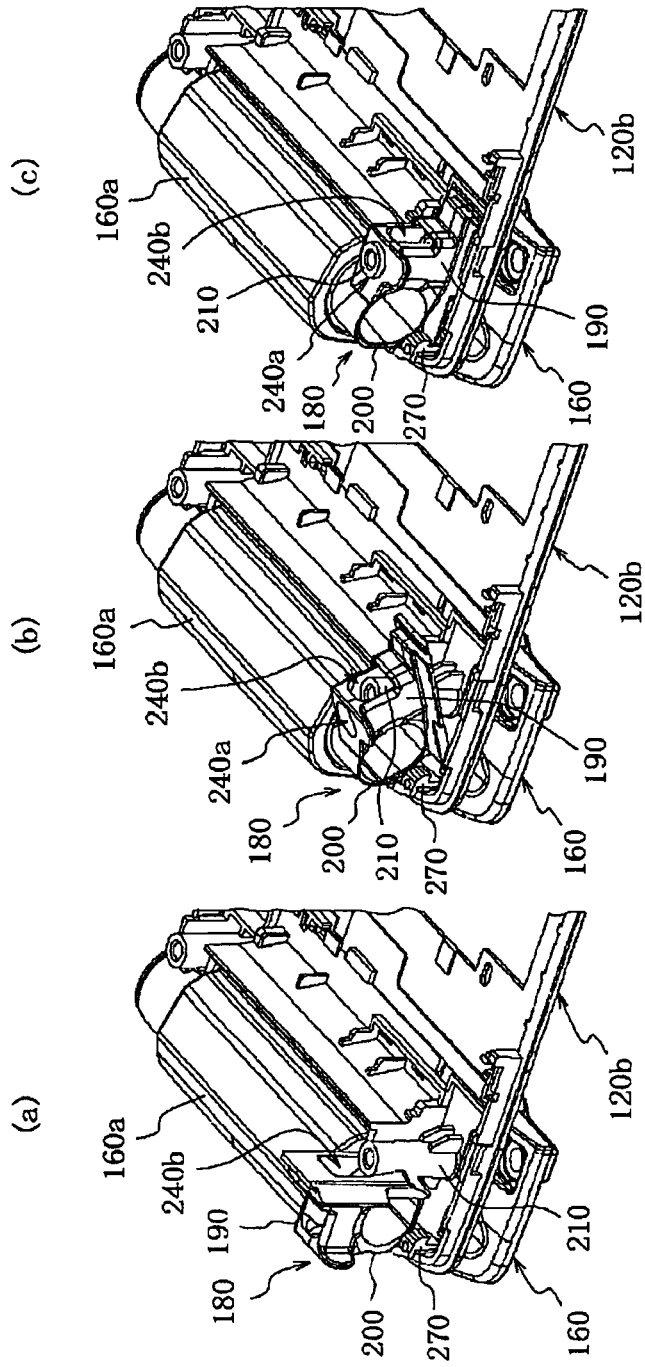
FIG. 15 illustrates the method for mounting the dummy hinge: (a) is a perspective view at the start of mounting, (b) is a perspective view of the dummy hinge being rotated, and (c) is a perspective view at the completion of mounting.
Figure 16:
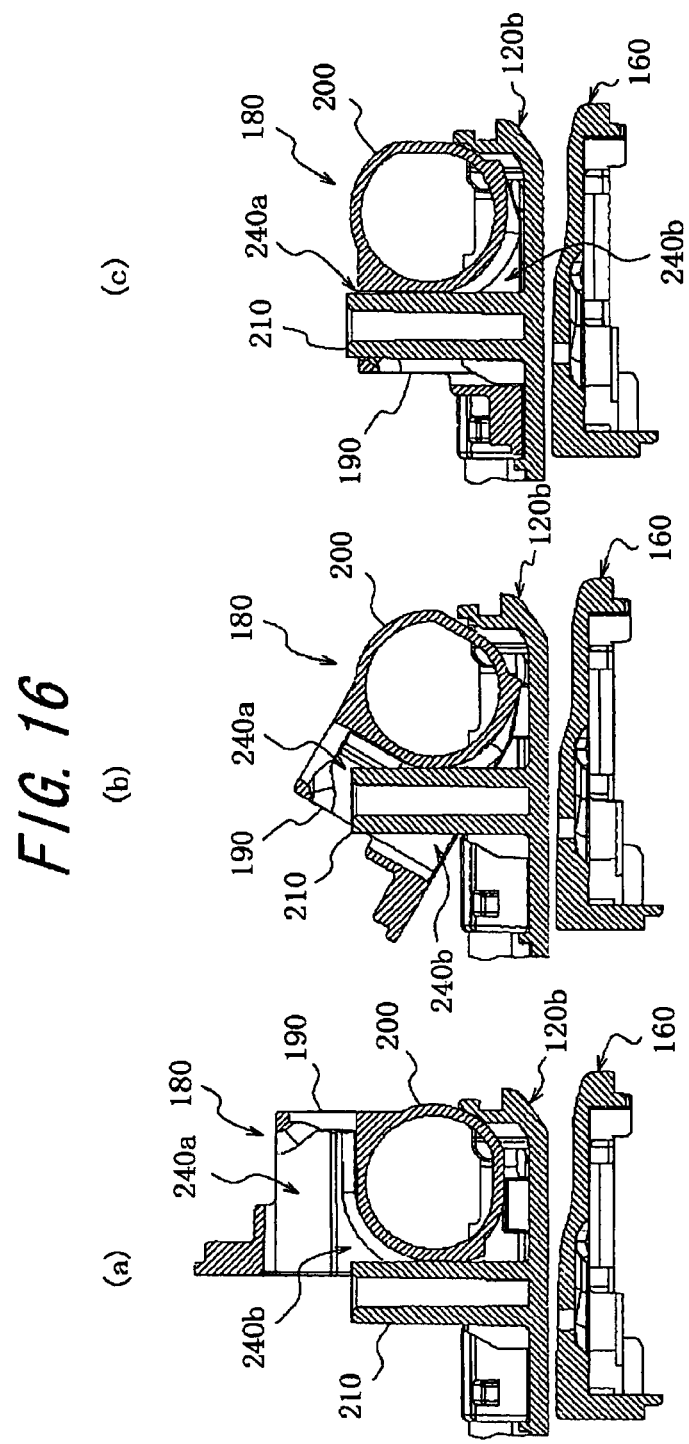
FIG. 16 illustrates the method for mounting the dummy hinge viewed from the direction different from that of FIG. 15: (a) is a cross-sectional explanatory view at the start of mounting, (b) is a cross-sectional explanatory view of the dummy hinge being rotated, and (c) is a cross-sectional explanatory view at the completion of mounting.

FIG. 15 illustrates a method for mounting the dummy hinge 180: (a) is a perspective view at a start of mounting, (b) is a perspective view of the dummy hinge being rotated, and (c) is a perspective view at a completion of mounting. FIG. 16 illustrates the method for mounting the dummy hinge 180 viewed from the direction different from that of FIG. 15: (a) is a cross-sectional explanatory view at a start of mounting, (b) is a cross-sectional explanatory view of the dummy hinge being rotated, and (c) is a cross-sectional explanatory view at a completion of mounting.

As shown in FIGS. 15 and 16, in order to mount the dummy hinge 180, first the dummy hinge 180, having the rotary unit 200 with the collar 230 mounted thereon being inserted into the bearing unit 130a of the hinge unit 130, is disposed next to the boss unit 210 (see FIG. 15(a) and FIG. 16(a)). At this point, the joint unit 190 of the dummy hinge 180 is in a stand-up state such that the boss unit 210 of the key front case 120b is located at the diameter-expanding hole 240b.

Next, the joint unit 190 in the stand-up state is rotated downward such that the boss unit 210 is inserted into the diameter-expanding hole 240b. At this point, the joint unit 190 smoothly rotates using the rotary unit 200 inserted into the bearing unit 130a as the rotational axis and, simultaneously, the boss unit 210 is inserted into the diameter-expanding hole 240b (see FIG. 15(b) and FIG. 16(b)).

Then, the joint unit 190 is rotated further downward such that a bottom face 190a of the joint unit 190 comes into contact with the inner face of the key front case 120b. At this point, the boss unit 210 inserted into the diameter-expanding hole 240b is guided from the diameter-expanding hole 240b to the fitting hole 240a. Simultaneously with the contact of the bottom face 190a of the joint unit 190 with the inner face of the key front case 120b, the boss unit 210 is mounted in the fitting hole 240a in a fitting state to protrude a top end thereof from a top of the fitting hole 240a (see FIG. 15(c) and FIG. 16(c)).

Since the insertion hole 220, into which the boss unit 210 of the key side housing 120 is inserted, is formed such that its diameter expands along the rotational direction of the rotary unit 200 as set forth above, it is possible to engage the dummy hinge 180 being rotated with the key side housing 120, while the rotary unit 200 is inserted into the bearing unit 130a and the key side housing 120 is attached to the hinge unit 130 (display side housing 110). It is thus possible to improve ease of assembly of the dummy hinge 180 and the key side housing 120, which leads to an improvement of the ease of assembly of the display side housing 110 and the key side housing 120.

In addition, as shown in FIG. 13, the joint unit 190 of the dummy hinge 180 has a regulatory unit 250, serving as a displacement regulatory unit, formed at the bottom thereof to come into contact with the key front case 120b on the side where the rotary unit 200 is positioned. The joint unit 190 also has an engaging unit 260 to engage with the key side housing 120 (key front case 120b) when the boss unit 210 is fitted in the fitting hole 240a. Each of the regulatory unit 250 and the engaging unit 260 is formed in the shape of a flange having a bottom portion expanding outward at a bottom portion 190a of the joint unit 190.

Figure 17:
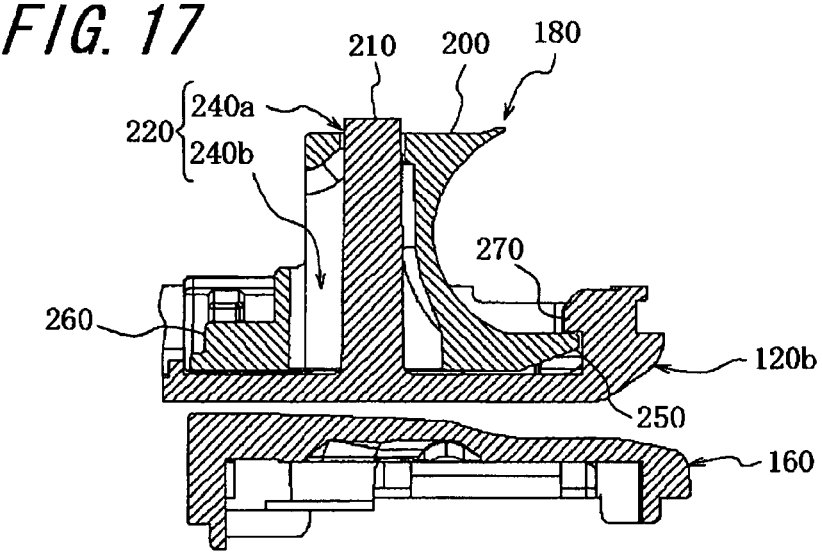
FIG. 17 is a cross-sectional explanatory view along the longitudinal direction of the key front case showing the regulatory unit of the dummy hinge.

FIG. 17 is a cross-sectional explanatory view along the longitudinal direction of the key front case 120b showing the regulatory unit 250 of the dummy hinge 180. FIG. 18 is a cross-sectional explanatory view illustrating the function of the regulatory unit 250 of the dummy hinge 180. As shown in FIG. 17, the regulatory unit 250 is formed at the bottom of the dummy hinge 180 at one end side of the longitudinal direction of the key side housing 120 when the boss unit 210 is fitted in the fitting hole 240a and the dummy hinge 180 is positioned and secured (on the right side in FIGS. 17 and 18). The regulatory unit 250 engages with a claw portion 270 (see FIG. 15) formed inside of the key front case 120b on the same end side corresponding to the regulatory unit 250.

A concave portion 120e, serving as an engaged unit, is formed facing outside at the one end of the key front case 120b. An engaging protrusion 120f, serving as an engaging unit, is formed facing inside at a corresponding one end of the key rear case 120c. The engaging protrusion 120f engages with the concave portion 120e to join the key front case 120b to the key rear case 120c. The regulatory unit 250 of the dummy hinge 180 comes into contact with and engages with the claw portion 270 from underneath thereof (see FIG. 15(c)), thus displacement of the concave portion 120e inward within the case is prevented when load in the opening direction is applied onto the housings 110 and 120. Since displacement of the concave portion 120e inward within the case is prevented, it regulates separation of the one end of the key front case 120b from the key rear case 120c.

That is, as shown in FIG. 18, when an overload in A direction is applied onto the key side housing 120, the force in B direction acts (direction vertical to the rotational axis) on the hinge-side end of the key front case 120b. When the force in B direction acts, the hinge-side end of the key front case 120b attempts to separate the concave unit 120e, being pressed inward within the case by the engaging protrusion 120f due to the action of the force, from the key rear case 120c by displacing inward into the case. However, the regulatory unit 250 of the dummy hinge 180, held by the bearing unit 130a via the rotary unit 200, prevents displacement of the concave portion 120e inward within the case by engaging with the claw portion 270 of the key front case 120b. Thereby, the hinge-side end of the key front case 120b does not separate from the key rear case 120c, which prevents the gap caused by separation.

As set forth above, when the stress in a turning direction acts onto either the key front case 120b or the key rear case 120c, it regulates displacement of the one of the case into a direction vertical to the turning axis of the rotary unit 200 (direction separating from the other case). It is thus possible to prevent the gap caused between the cases 120b and 120c. Moreover, being capable of preventing the gap, it enables simplification and downsizing of the engaging structure of the cases 120b and 120c.

In addition, according to the constitution set forth above, the key side housing 120 comprises the key front case 120b and the key rear case 120c, and the joint unit 190 of the dummy hinge 180 is joined to the key front case 120b, while the regulatory unit 250 of the dummy hinge 180 engages with the key front case 120b. The regulatory unit 250 thereby engages with the key front case 120b to which the joint unit 190 is joined, regulating displacement of the key front case 120b. Since displacement of the key front case 120b is regulated by the regulatory unit 250, it can desirably prevent the gap caused between the cases 120b and 120c by joint of the joint unit 190 of the dummy hinge 180 and the key front case 120b even when the force in the direction vertical to the rotational axis acts on the hinge-side end of the key front case 120b when the key side housing 120 is turning.

Moreover, according to the constitution set forth above, the joint unit 190 of the dummy hinge 180 is joined to the key front case 120b at a position located more at the other end side of the key side housing 120 than the rotational axis of the rotary unit 200. In addition, the regulatory unit 250 of the dummy hinge 180 engages with the key front case 120b through the claw portion 270 located more at the one end side of the key side housing 120 than the joint section of the joint unit 190 to the key front case 120b. Thereby, the joint unit 190 joins to the key front case 120b more at the other end of the key side housing 120 than the rotational axis of the rotary unit 200, which may easily cause displacement of the key front case 120b of the key side housing 120 in the direction the gap will be caused at the one end side. However, since the regulatory unit 250 of the dummy hinge 180 regulates displacement of the key front case 12*b* at the end thereof, it can desirably prevent the gap caused between the cases 120*b* and 120*c*.

Furthermore, according to the constitution set forth above, the display side housing 110 and the key side housing 120 are connected to one another to be able to turn in relation to one another between the close state where they are disposed to face each other and the open state where they are disposed to be unfolded from one another. The key front case 120*b* of the key side housing 120 is a casing member located close to the display side housing 110 in the close state. Thus, in spite of the force acting on the key front case 120*b* among the casing members of the key side housing 120 in the direction separating the key front case 120*b* from the key rear case 120*c* when the housings 110 and 120 are turned in an unfolding direction, i.e., from the close state to the open state, it can desirably prevent the gap caused between the casing members of the cellular phone 100 of a folding type as the mobile electronics apparatus of the folding type. This is because displacement of the key front case 120*b* is regulated by engaging with the regulatory unit 250 of the dummy hinge 180.

Furthermore, according to the constitution set forth above, among the casing members of the key side housing 120, which is one of the display side housing 110 and the key side housing 120, the key rear case 120*c* has the engaging protrusion 120*f* formed thereon, while the key front case 120*b* has the concave portion 120*e* formed thereon to be engaged with the engaging protrusion 120*f*. In addition, the key front case 120*b* and the key rear case 120*c* are joined to one another by engagement of the engaging protrusion 120*f* and the concave portion 120*e*. Furthermore, the regulatory unit 250 of the dummy hinge 180 engages with the claw portion 270 located at the position corresponding to the concave portion 120*e*. Since displacement of the casing members is thus regulated at the joint of the both cases 120*b* and 120*c*, it can desirably prevent the gap and enables simplification of a joint structure of the both cases 120*b* and 120*c*.

Figure 19:
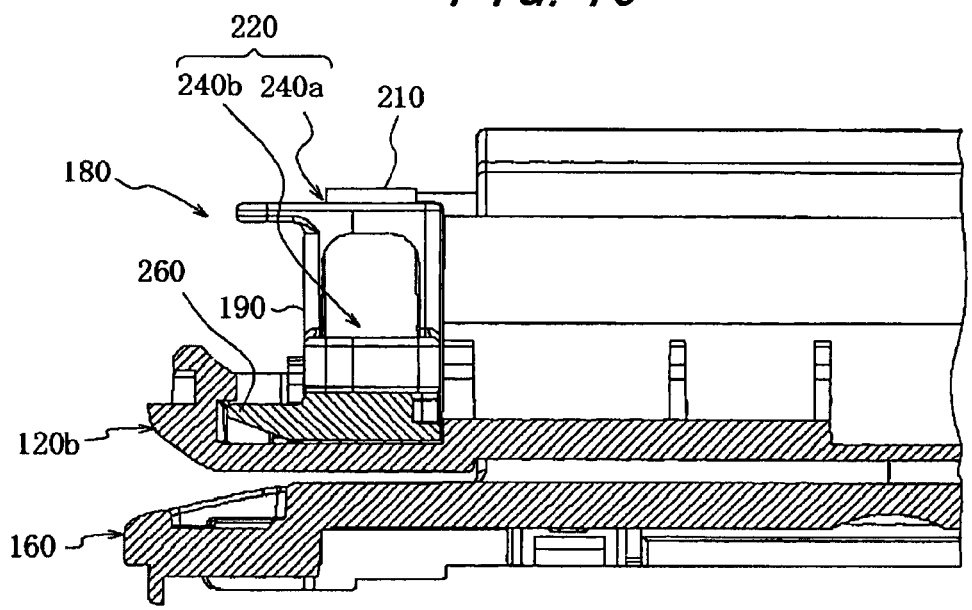
FIG. 19 is a cross-sectional explanatory view along the width direction of the key front case showing the engaging unit of the dummy hinge.

FIG. 19 is a perspective explanatory view along the width direction of the key front case 120*b* showing the engaging unit 260 of the dummy hinge 180. As shown in FIG. 19, when the rotary unit 200 being mounted in the bearing unit 130*a* is rotated and thus the boss unit 210 is fitted in the fitting hole 240*a* of the insertion hole 220, the engaging unit 260 is engaged with a protruding claw 120*d* formed on the side of the key front case 120*b*, i.e., the key side housing 120. The engaging unit 260 is formed at the bottom of the joint unit 190 at the one end side (on the left side in FIG. 19) in the width direction of the key side housing 120. Turn of the dummy hinge 180 is thus regulated, which enables easy connection of the display side housing 110 and the key side housing 120 via the dummy hinge 180.

Figure 20:
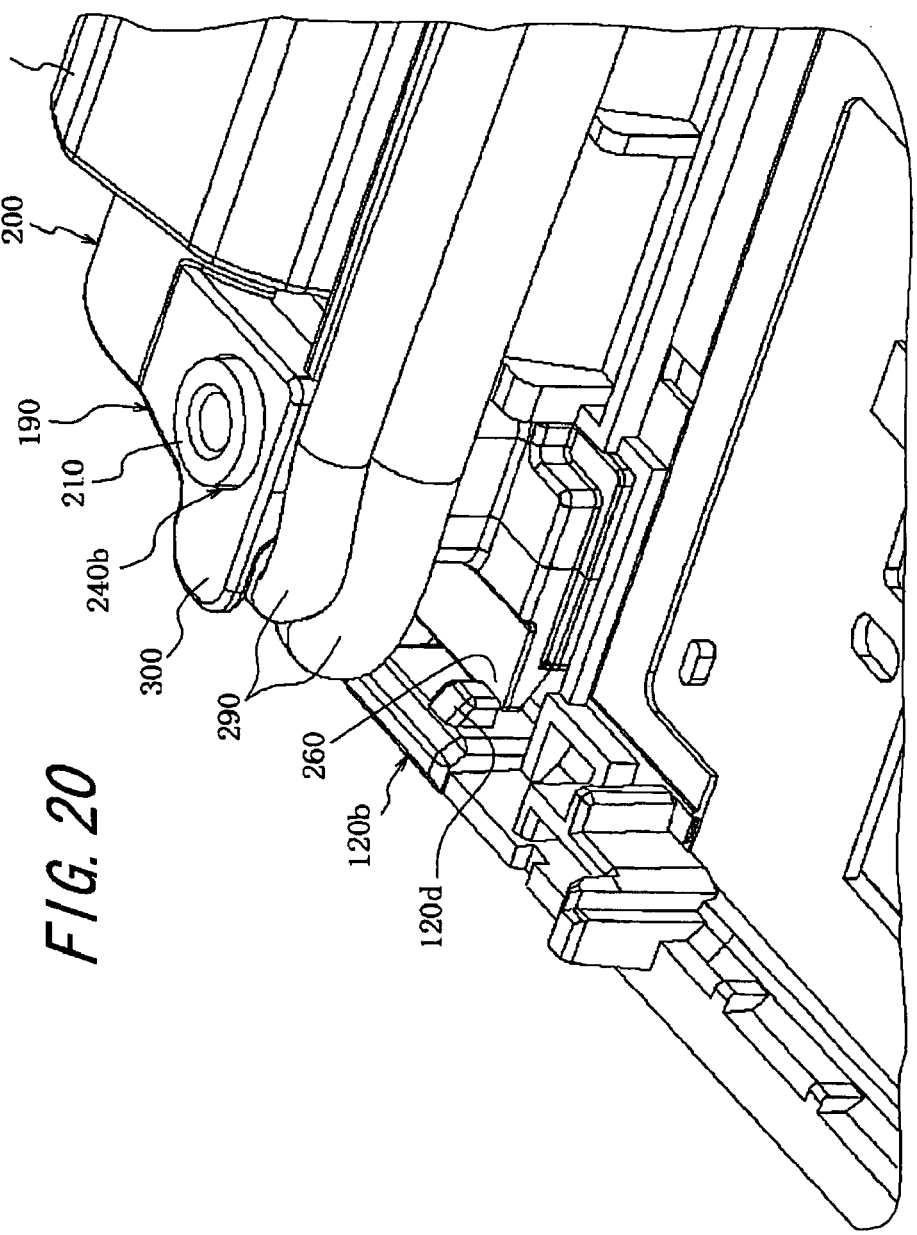
FIG. 20 is a perspective explanatory view of the positioning status of the cable members, inserted into the rotary unit, in relation to the dummy hinge.

FIG. 20 is a perspective explanatory view of the positioning status of cable members, inserted into the rotary unit 200, in relation to the dummy hinge 180. As shown in FIG. 20, the cable members 29 (thin coaxial cables, for example), arranged through insides of the display side housing 110 and the key side housing 120, are inserted into the rotary unit 200. The cable members 290 are disposed along the joint unit 190 of the dummy hinge 180. A positioning unit 300, in the shape of a visor for shielding cable members 290 from on top thereof, is formed at the top end of the joint unit 190. By use of the positioning unit 300, it is possible to guide the cable members 290 along the peripheral surface of the joint unit 190 to the rotary unit 200, while preventing the cable members 290 from moving upward. It is thus possible to improve workability in wiring the cable members 290.

Figure 22:
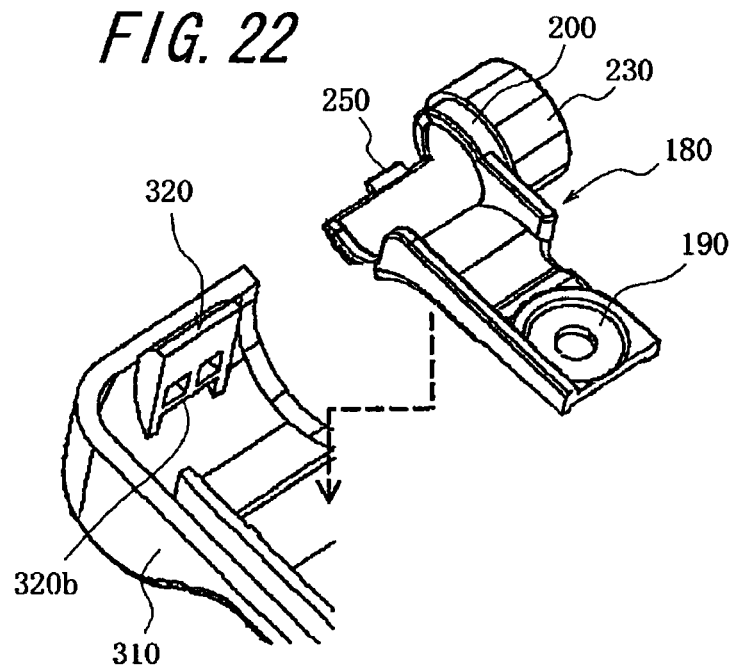
FIG. 22 is an exploded perspective view illustrating the hinge-side end of the front case and the dummy hinge of FIG. 21.
Figure 23:
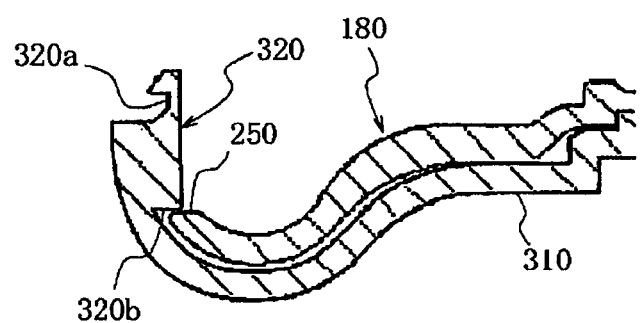
FIG. 23 is a cross-sectional view illustrating an assembled state of the hinge-side end of the front case and the dummy hinge of FIG. 21.

FIG. 21 illustrates an assembled state of inside the hinge-side end of the front case of the housing on the liquid crystal display side and the dummy hinge of the cellular phone in accordance with another embodiment of the present invention, and (a) is an overall view of inside of the front case on the hinge-side end and the dummy hinge and (b) is a perspective view illustrating an enlarged view of the area indicated by an arrow C in the (a). FIG. 22 is an exploded perspective view illustrating the hinge-side end of the front case and the dummy hinge of FIG. 21. FIG. 23 is a cross-sectional view illustrating an assembled state of the hinge-side end of the front case and the dummy hinge of FIG. 21. It is to be noted that in these figures, the same portions as those of the embodiments set forth above are shown using the same reference signs.

As shown in FIGS. 21 to 23, in the cellular phone of the present embodiment, the joint unit 190 of the dummy hinge 180 is jointed to a front case 310 of the display side housing 110 by a screw member (not shown). The rotary unit 200 of the dummy hinge 180 is turnably connected to the key side housing (not shown) via a collar 230. Furthermore, the front case 310 is joined to a rear case (not shown) by engagement of a concave portion 320*a* (see FIG. 23) and the claw portion formed in the rear case facing inward. The concave portion 320*a* is formed facing outward on the claw portion 320 protruding inside the front case 310 in the vicinity of the dummy hinge 180.

Here, the regulatory unit 250 formed protruding from the joint unit 190 of the dummy hinge 180 prevents displacement of the claw portion 320 by engaging with a concave portion 320*b* (see FIG. 23). At this point, while the joint unit 190 of the dummy hinge 180 is jointed to the inner face of the front case 310, the regulatory unit 250 engages with the concave portion 320*b* (see FIG. 23) formed facing inward on the claw portion 320 of the front case 310.

Accordingly, in the same manner as that of the previous embodiment, when force in the turning direction acts onto one of the front case 310 and the rear case in the present embodiment, it prevents displacement in the direction vertical to the turning axis of the rotary unit 200 (direction separating from the other case). It is thus possible to prevent the gap caused between the cases, and thereby enables simplification and downsizing of the joint structure of the cases.

Although being described based on the embodiments shown in the figures, the present invention is not limited thereto but includes various modifications made thereto without departing from the spirit of the present invention. For example, although in the above embodiment the displacement regulatory unit of the connect member engages with the casing member of the second housing, one end of which is jointed to the joint unit of the connect member, it is also possible to engage the displacement regulatory unit of the connect member with the casing member of the first housing. In such a case, since the connect member turns in relation to the first housing, it is possible to prevent the gap caused between the casing members of the first housing by engaging the displacement regulatory unit of the connect member with the casing member of the first housing when the first housing and the second housing are in an open position.

In addition, although the displacement regulatory unit of the connect member is constructed so as to be joined to the casing member to which the joint unit 190 is joined, it is also possible to join the displacement regulatory unit to the other casing member to which the joint unit 190 is not joined. Moreover, although the displacement regulatory unit is constructed so as to engage with the casing member at the position corresponding to the engaging unit (engaging protrusion 120*f* and concave portion 120*e*) of both of the casing members, the displacement regulatory unit may also be engaged with the casing member at a position elsewhere than the engaging unit. It is to be noted that the present invention can be applied not only to the cellular phone but also to other mobile electronic apparatuses having two housings turnably connected to one another via the connect member.

The invention claimed is:

1. A mobile electronic apparatus comprising:
a first housing having a bearing unit at one end thereof;
a connect member having a rotary unit mounted in the bearing unit at one end thereof and a joint unit at the other end thereof; and
a second housing joined to the joint unit at one end thereof, wherein the first housing and the second housing are turnably connected to one another via the connect member,
the second housing has a boss unit formed extending in a direction vertical to a rotational axis of the rotary unit,
the joint unit has an insertion hole formed thereon to insert the boss unit thereinto, and
the insertion hole is formed to have a fitting hole to fit the boss unit therein when the joint unit and the second housing are joined to one another, and a diameter-expanding hole in communication with the fitting hole and expanded along a rotational direction of the rotary unit toward the second housing.

2. The mobile electronic apparatus according to claim 1, wherein the joint unit has an engaging unit to engage with the second housing when the boss unit is fitted in the fitting hole.

3. The mobile electronic apparatus according to claim 1, wherein the second housing comprises a first casing member with the boss unit formed thereon and a second casing member joined to the first casing member via the connect member therebetween, and the connect member has a regulatory unit, formed on a side where the rotary unit is located, and engages with one end of the first casing member so as to regulate separation of the one end from the rotary unit.

4. The mobile electronic apparatus according to claim 1, wherein the second housing comprises a first casing member with the boss unit formed thereon and a second casing member joined to the first casing member via the connect member there between, and is constructed by joining the first casing member and the second casing member by a screw member screwed into the boss unit, and the connect member is joined to the first casing member by the screw member screwed into the boss unit.

5. The mobile electronic apparatus according to claim 1, wherein a cable member arranged through insides of the first housing and the second housing is inserted into the rotary unit, and the connect member has a positioning unit formed thereon to position the cable member.

6. The mobile electronic apparatus according to claim 1, wherein the diameter-expanding hole comprises a clearance shape which does not interfere with the boss unit during a rotational fitting.

7. The mobile electronic apparatus according to claim 6, wherein the diameter-expanding hole guides the boss unit to the fitting hole during the rotational fitting.

8. A mobile electronic apparatus comprising:
a first housing having a bearing unit at one end thereof;
a connect member having a rotary unit mounted in the bearing unit at one end thereof and a joint unit at the other end thereof; and
a second housing joined to the joint unit at one end thereof, wherein the first housing and the second housing are turnably connected to one another by the connect member, one of the first housing and the second housing comprises a first casing member and a second casing member joined to one another in a direction vertical to a rotational axis of the rotary unit, and
the connect member comprises a displacement regulatory unit to regulate displacement of the one of the casing members separating from the other casing member in the direction vertical to the rotational axis by engaging with the one of the casing members.

9. The mobile electronic apparatus according to claim 8, wherein the second housing comprises the first casing member and the second casing member, the joint unit is joined to the first casing member, and the displacement regulatory unit engages with the first casing member.

10. The mobile electronic apparatus according to claim 9, wherein the joint unit joins to the first casing member on a side of the other end of the second housing from the rotational axis of the rotary unit, and the displacement regulatory unit engages with the first casing member more on the side of the one end of the second housing than a joint portion of the joint unit joined to the first casing member.

11. The mobile electronic apparatus according to claim 9, wherein the first housing and the second housing are connected to one another to be capable of turning relatively to one another between a first state where the housings are disposed to face each other and a second state where the housings are unfolded from each other, and the first casing member is a casing member located on the side of the second housing in the first state.

12. The mobile electronic apparatus according to claim 8, wherein an engaging unit is formed on one of the first casing member and the second casing member while an engaged unit to be engaged with the engaging unit is formed on the other casing member, the first casing member and the second casing member are joined to one another by engagement of the engaging unit and the engaged unit, and the displacement regulatory unit engages with a portion corresponding to the engaging unit or the engaged unit.

13. The mobile electronic apparatus according to claim 8, wherein the second housing comprises a boss unit extending in a direction vertical to a rotational axis of the rotary unit, and wherein the joint unit comprises an insertion hole, the insertion hole comprising a fitting hole to receive the boss unit when the joint unit and the second housing are joined to one another, and a diameter-expanding hole in communication with the fitting hole and expanded along a rotational direction of the rotary unit toward the second housing.

14. The mobile electronic apparatus according to claim 13, wherein the diameter-expanding hole comprises a clearance shape which does not interfere with the boss unit during a rotational fitting.

15. The mobile electronic apparatus according to claim 14, wherein the diameter-expanding hole guides the boss unit to the fitting hole during the rotational fitting.

16. The mobile electronic apparatus according to claim 8, wherein the displacement regulatory unit comprises a flange.

17. The mobile electronic apparatus according to claim 16, wherein the flange is configured to engage with a claw portion of the one of the casing members.

18. The mobile electronic apparatus according to claim 17, wherein the flange is configured to engage with a concave portion of the claw portion, wherein the concave portion faces inward on the claw portion.

* * * * *